United States Patent
Haartsen et al.

(10) Patent No.: US 7,969,297 B2
(45) Date of Patent: Jun. 28, 2011

(54) SYSTEM AND METHOD FOR DETERMINING POSITIONING INFORMATION VIA MODULATED LIGHT

(75) Inventors: Jacobus C. Haartsen, Hardenberg (NL); William O. Camp, Jr., Chapel Hill, NC (US); Phillip Marc Johnson, Durham, NC (US); Norbert Donald Ingram, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 303 days.

(21) Appl. No.: 12/130,249

(22) Filed: May 30, 2008

(65) Prior Publication Data

US 2009/0284366 A1 Nov. 19, 2009

Related U.S. Application Data

(60) Provisional application No. 61/053,198, filed on May 14, 2008.

(51) Int. Cl.
*G08B 1/00* (2006.01)
(52) U.S. Cl. ..... 340/531; 340/555; 340/7.5; 340/539.13
(58) Field of Classification Search ............. 340/531, 340/7.5, 539.13, 555, 556, 557; 356/614; 398/172, 130, 151
See application file for complete search history.

(56) References Cited

U.S. PATENT DOCUMENTS

| | | | |
|---|---|---|---|
| 6,381,006 B1 * | 4/2002 | Ramstrom | 356/4.01 |
| 6,400,482 B1 * | 6/2002 | Lupton et al. | 398/140 |
| 6,473,038 B2 * | 10/2002 | Patwari et al. | 342/450 |
| 6,865,347 B2 * | 3/2005 | Perkins et al. | 398/172 |
| 7,091,852 B2 * | 8/2006 | Mason et al. | 340/539.13 |
| 7,162,368 B2 | 1/2007 | Levi et al. | |
| 2002/0089722 A1 | 7/2002 | Perkins et al. | 359/155 |
| 2004/0239498 A1 | 12/2004 | Miller | |
| 2005/0231128 A1 | 10/2005 | Franklin | 315/224 |
| 2007/0058987 A1 | 3/2007 | Suzuki | |
| 2007/0147843 A1 | 6/2007 | Fujiwara | |
| 2007/0254694 A1 | 11/2007 | Nakagwa et al. | |
| 2008/0095533 A1 | 4/2008 | Lee | |

FOREIGN PATENT DOCUMENTS

GB 2285135 A 6/1995
WO WO 03/082094 10/2003

OTHER PUBLICATIONS

International Search Report and Written Opinion dated Apr. 1, 2009 issued in corresponding PCT application No. PCT/US2008/086812, 9 pages.

(Continued)

*Primary Examiner* — Anh V La
(74) *Attorney, Agent, or Firm* — Snyder, Clark, Lesch & Chung, LLP

(57) ABSTRACT

Light sources are affixed at appropriate positions in a multi-level structure or in an obstructed environment. The light sources generate modulated light signals, such as controlled light-emitting diodes, which identify the positions of the light sources by their three-dimensional global positioning coordinates and/or equivalent representation that specifies their in situ locations in the environment. Mobile communication devices, upon receiving the light signals, can derive spatial positioning information and transmit such information to a remote location, such as an emergency response system.

19 Claims, 10 Drawing Sheets

OTHER PUBLICATIONS

International Preliminary Report on Patentability dated Nov. 5, 2010 issued in corresponding PCT application No. PCT/US2008/086812, 10 pages.

Komine, T. et al, Performance Evaluation of Narrowband OFDM on Integrated System of Power Line Communication and Visible Light Wireless Communication, Wireless Pervasive Computing, 2006 1st International Symposium, Apr. 10, 2006, 6 pp.

Tanaka, Y. et al, Indoor Visible Communication Utilizing Plural White LEDs as Lighting, 2001 12th IEEE International Symposium on Personal, Indoor and Mobile Radio Communications, Sep./Oct. 2001, pp. F-81-F85, vol. 2.

Komine T, et al, Fundamental Analysis for Visible-Light Communication System Using LED Lights, IEEE Transactions on Consumer Electronics, Feb. 1, 2004, pp. 100-107, vol. 50.

* cited by examiner

FIG. 8A
FIG. 8B
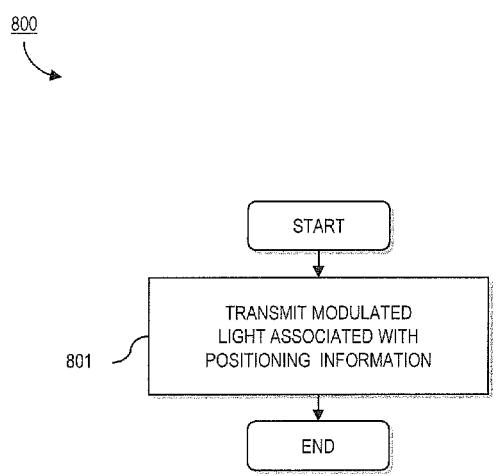
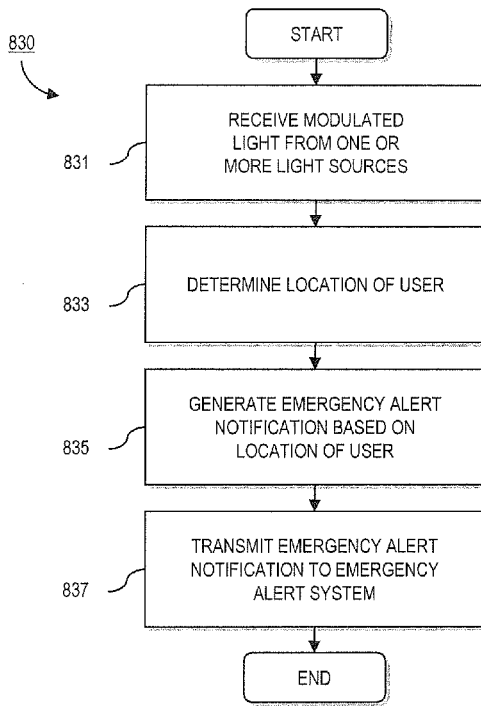

EMERGENCY ALERT NOTIFICATION

901 {
NAME:      JOHN DOE
NUMBER:    (123) 456 – 7890

903 {
DATE:      JAN. 1
TIME:      12:50 PM

USER PROFILE INFORMATION

909 {
AGE:         24
BLOOD TYPE:  O-
RACE:        CAUCASIAN
        ⋮              ⋮
RX ALLERGIES:  PENICILLIN

GENERAL POSITION

905 {
BUILDING:  EMPIRE STATE BUILDING
ADDRESS:   350 FIFTH AVENUE
           NEW YORK, NEW YORK 10118
FLOOR:     1$^{ST}$ FLOOR LOBBY

SPECIFIC COORDINATES

907 {
LATITUDE:   40° 44' 53" NORTH
LONGITUDE:  73° 59' 10" WEST
ALTITUDE:   47 FT ABOVE SEA LEVEL

SYSTEM AND METHOD FOR DETERMINING POSITIONING INFORMATION VIA MODULATED LIGHT

RELATED APPLICATIONS

This application claims the benefit of the earlier filing date under 35 U.S.C. §119(e) of U.S. Provisional Application Ser. No. 61/053,198 filed May 14, 2008, entitled "System and Method for Determining Position Information Via Modulated Visible Light," the entirety of which is incorporated herein by reference.

FIELD OF THE INVENTION

The present invention relates to communication devices, and more particularly to determining with greater accuracy the location of communication devices.

BACKGROUND

Lifestyles have become increasingly reliant on mobile communications. Wireless communication devices, such as cellular phones, laptop computers, pagers, personal communication systems (PCS), personal digital assistants (PDA), and the like, provide advantages of ubiquitous communication without geographic or time constraints, as well as the added security of being able to contact help in the event of an emergency. Mobile terminals have been equipped with versatile location-awareness technologies, such as global position system (GPS) tracking features. Such features enable a consumer to monitor the position of the terminal as well as transmit its location to emergency response personnel during emergency situations.

The position of a device is monitored through GPS technologies that utilize a system of orbital satellites to determine positioning information. The constellation of satellites will transmit very low power interference and jamming resistant signals to a wireless device GPS receiver, which may receive signals from multiple satellites at once. The GPS receiver may determine three-dimensional spatial positioning information from GPS signals obtained from at least four satellites. These GPS signals are transmitted over two spread spectrum microwave carrier signals that are shared by the GPS satellites. Measurements from satellite tracking and monitoring stations located around the world are incorporated into orbital models for each satellite to compute precise orbital or clock data. Thus, a wireless device employing a GPS receiver identifies GPS signals from at least four satellites, decodes the ephemeris and clock data, determines a pseudo range for each satellite, and then computes the position of the receiving antenna of the GPS receiver. Accordingly, the spatial position of the receiving antenna can be determined with great accuracy and convenience.

Unfortunately, since GPS signals are transmitted over two low power spread spectrum microwave carrier signals, the GPS receiver must have an unobstructed "view" of the GPS satellites. Indoor environments, e.g., buildings, cellars, edifices, garages, pavilions, or other urban settings, obstruct the "field of view" of the GPS receiver, and GPS tracking becomes unreliable. Tracking is unavailable when the GPS signals are too weak or cannot reach the GPS receiver.

Conventional location-awareness technologies are further limited by an inability to identify the vertical location of a device in a multistory building. While planar positioning may be obtainable, there is no provision for defining accurate three dimensional spatial coordinate positions. Emergency response personnel can arrive at an appropriate address in response to an emergency call, but lose valuable time to precisely locate where in the building help is required.

Accordingly, a need exists for positioning tools and methodology that enable users in obstructed areas to determine more accurately and/or report their positions. The particular need to derive absolute three-dimensional position can be of critical importance.

DISCLOSURE

The above described needs are fulfilled, at least in part, by fixing light sources, such as visible light sources, infrared light sources, etc., at appropriate positions in a multilevel structure. The light sources generate modulated light signals, for example by means of light-emitting diodes, which identify the positions of the light sources. Large buildings may include a plurality of spaced light sources on any given floor level. The spatial positioning information may include three-dimensional global positioning coordinates of the light source, including latitude, longitude, and altitude, or equivalent representation. The signals may include codes that identify the floor level of the associated light source. Light signal generation may be implemented by on-off keying with application of direct-sequence spreading or Manchester coding to a light source.

Communication stations, which may be mobile stations, are equipped to receive light signals generated and transmitted by the light sources in their proximate respective vicinities. A receiving station has the processing capability to derive the spatial positioning information from a received light signal. This information can be displayed at the receiving station. The light signal may be received by a camera in a mobile station device, a charge-coupled device of the camera then converting the light signals to electrical digital signals.

The communication stations can generate emergency alert notification for transmission to a remote emergency response system. Transmission can be initiated automatically or by human intervention. Spatial positioning information, derived by a station from a light signal received from a proximate light source, can be included in the transmitted emergency alert notification. An emergency response team can, thereby, accurately pinpoint a location within a large building based on included information corresponding to floor level and/or specific position on the level, and, thus, optimize response time to the emergency.

Additional advantages of the present invention will become readily apparent to those skilled in this art from the following detailed description, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which:

FIGS. 8A-8C are flowcharts of processes for providing emergency alert notifications for the system described with respect to FIG. 7, according to an exemplary embodiment; and FIG. 9 is a schematic illustration of an emergency alert notification presenting positioning information, according to an exemplary embodiment.

DETAILED DESCRIPTION

Positioning tools and methodology are provided herein for enabling relative and/or absolute three-dimensional positioning information to be accurately determined through light communication, such as visible light communication, infrared communication, etc., when conventional location-awareness technologies, such as global positioning system (GPS) technologies, are unreliable or otherwise unavailable. Positioning information that is determined through light communication can be reported to emergency response personnel in the event of an emergency. Light communication techniques employing illumination sources, such as light-emitting diodes (LEDs), may be utilized to convey information. Since LEDs provide bright, power efficient illumination that is reliable, durable, and capable of modulation imperceptible to human beings, LEDs may be configured to provide adequate illumination, while simultaneously configured to convey information. LED light communication techniques, thus, may be utilized to assist or supplant GPS technologies while mobile station users are located indoors or situated in otherwise obstructed environments.

Figure 1:
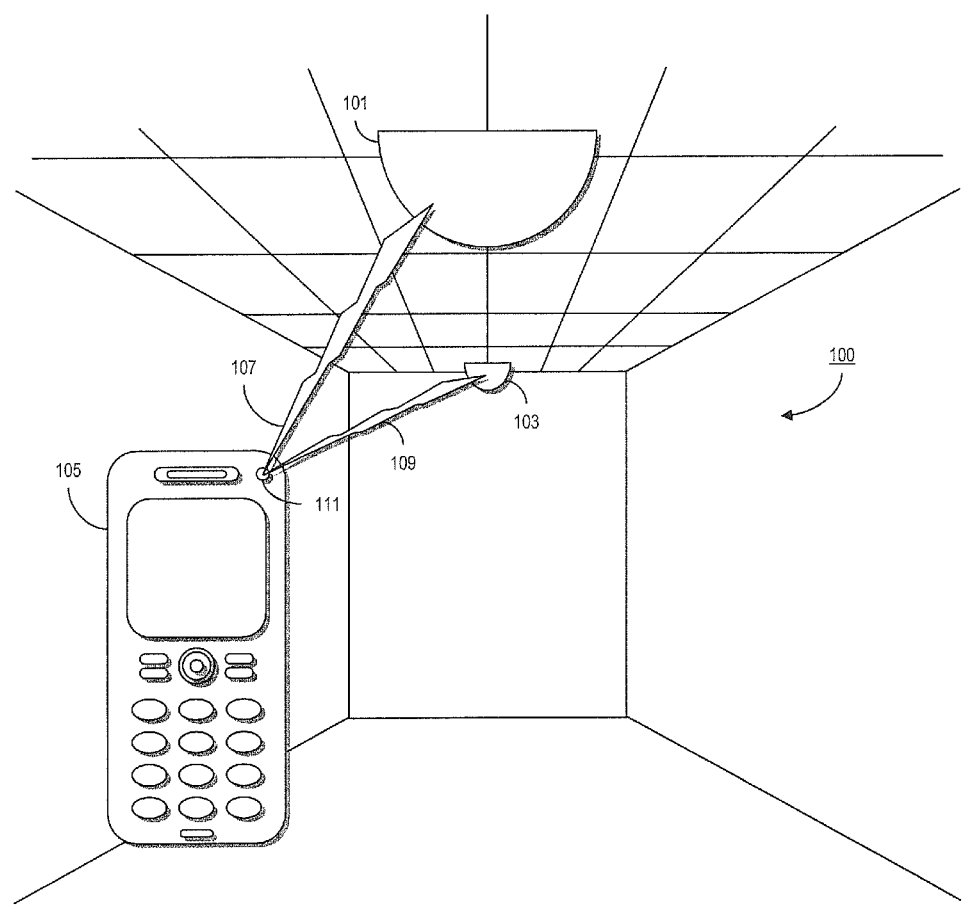
FIG. 1 is a perspective illustration of an indoor environment capable of providing mobile stations with positioning information through light communication, according to an exemplary embodiment.

An indoor environment capable of providing mobile stations with positioning information through light communication is illustrated in FIG. 1. While light communication is described through modulated light emitting diode (LED) illumination, it should be appreciated that other suitable light sources capable of providing adequate illumination, while at the same time, capable of being modulated to convey information, are contemplated.

Indoor environment 100, such as a building, cellar, edifice, garage, pavilion, etc., includes one or more light sources 101 and 103, which may be visible light sources. The light sources may provide adequate illumination for environment 100, as well wireless communication with mobile station 105 through one or more modulated light wave signals 107 and 109. Mobile station 105 includes a detecting light-receiving unit 111, such as a charge-coupled device (CCD), light-sensitive sensor, photodiode, etc., capable of perceiving or otherwise detecting signals 107 and 109. Unit 111 may be a standalone component of mobile station 105 or may be included as part of a conventional camera (not shown) of mobile station 105. Wireless optical communication system utilizing indoor LED lights are capable of communicating with mobile station 105 without hindering standardized lighting functionality.

Alternatively, visible light sources 101 and 103 may be indoor LED lights capable of modulating visible light waves that are imperceptible to human beings. For instance, light sources 101 and 103 can be modulated with an on-off keying (OOK) technique, wherein a "1" is carried as an on-pulse, and a "0" is carried by an off-pulse. Using a 7-bit coding scheme, light sources 101 and 103 can be configured to convey up to 128 distinct numbers, which, in certain embodiments, may be utilized to convey 128 levels (or floors) of a building. According to other embodiments, other modulation techniques may be utilized to convey more elaborate positioning information or other data for use by mobile station 105 to accurately determine its spatial position. For instance, modulation may be applied in a less than full on, full off keying technique, wherein the amplitude of a light wave signal may be slightly (or otherwise) varied to convey information. Variance in amplitude may occur at frequencies greater than a flicker rate perceptible to the human eye, such as around 20 hertz. However, faster frequencies of modulation are contemplated and may be employed to increase the rate of information transportation between light sources 101 and 103 and mobile station 105. For example, modulation may occur within the ranges of kilohertz, megahertz, gigahertz, etc. Other techniques for modulation may include amplitude-shift keying (ASK), continuous-phase modulation (CPM), frequency-shift keying (FSK), minimum-shift keying (MSK), phase-shift keying (PSK), pulse-position modulation (PPM), quadrature amplitude modulation (QAM), and trellis coded modulation (TCM), as well as any other suitable technique. Further, the luminance of light sources 101 and 103 may be configured to comply with any conventional illumination standard, such as illumination standards for the movement and/or activity of pedestrians, machines, and vehicles within varied environments like construction sites, corridors, excavation areas, factories, kitchens, loading bays, offices, parks, plants, etc.

Mobile station 105 may embody any suitable wireless communication device, such as a cellular, satellite, or other wireless or radio phone with a multi-line display; a personal communications system (PCS) terminal that may combine wireless telephony features with data processing, facsimile, and/or data communication capabilities; or a personal digital assistant (PDA) that may include wireless telephony features, a pager, "online" access, web browsing, an organizer, a calendar, and/or a radio (AM/FM) receiver, as well as embody a mobile computing device capable of wireless communications, such as a laptop, palmtop receiver, or other appliance that includes wireless telephony features. Mobile station 105 may also be referred to as a "pervasive computing" device capable of communicating with other devices via short messaging service (SMS) protocols or other protocols that allow for simultaneous communications of voice, data, and/or video information.

Figure 2:
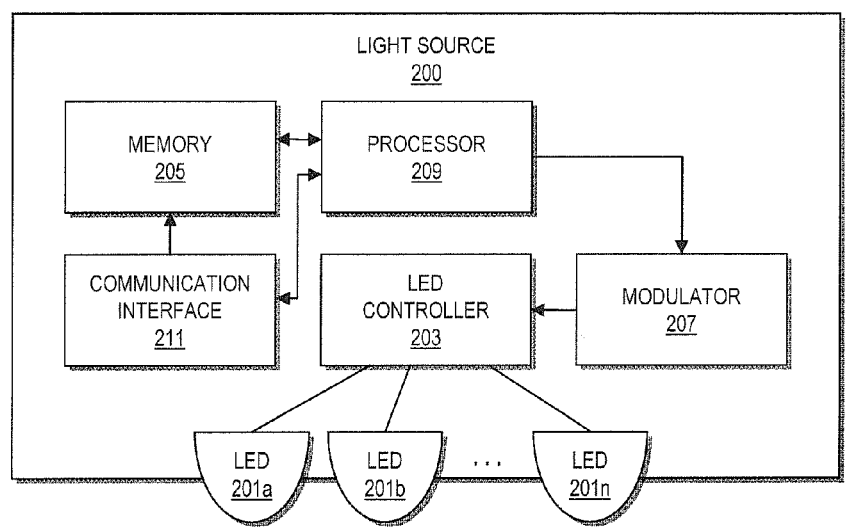
FIG. 2 is a block diagram of a light source configured to communicate with mobile stations through light wave signals, according to an exemplary embodiment.

FIG. 2 is a block diagram of a light source 200 that may be utilized in the exemplified embodiment of FIG. 1. Source 200 includes LEDs 201a-201n, LED controller 203, memory 205, modulator 207, and processor 209. According to other embodiments, visible light source 200 may include one or more other components configured to execute the processes described herein for light communication. For instance, a communication interface 211 may be provided to receive information that is to be subsequently broadcasted by light source 200 through one or more modulated light wave signals.

Light source 200, via LEDs 201a-201n, may be configured to illuminate a space, as well as to emit modulated light wave signals, such as signals 107 and 109. Processor 209 accesses memory 205 to obtain data corresponding to positioning information. This data is applied to modulator 207 to modulate the data into a light transmission signal, such as a visible light transmission signal, that is to be communicated to mobile station 105. LED control signals are generated for driving LEDs 201a-201n. Modulator 207 may apply direct-sequence spreading, Manchester coding, or other suitable methodology to reduce the impact of ambient light and signal interference.

The control signals excite LEDs 201a-201n which output illumination including at least one modulated light wave signal embodying or associated with positioning information, such as latitude, longitude, and altitude information. The positioning information may also include an address, floor, structure name, location name, etc. The modulated light wave signals may contain information for resolving the spatial position of mobile station 105. For instance, the information may correspond to timing information and/or reference positioning information that is utilized by mobile station 105 to determine its spatial position.

Communication interface 211 may be utilized to initialize light source 200. That is, communication interface 211 may be employed to input (or upload) data corresponding to positioning information to memory 205 and/or processor 209. According to one embodiment, communication interface 211 communicates via any suitable wired (e.g., coaxial cable, optical fiber, twisted pair, etc.) and/or wireless (e.g., light wave, radio wave, microwave, etc.) communication medium. For instance, communication interface 211 may communicate over a power line communication system, the public switched telephone network (PSTN), the Internet, a wireless area network, a wired area network, or other suitable communication system, such as a short-range communication system, a near-field communication system, or a proprietary network of a service provider, such as a cable or fiber optic network. In particular embodiments, communication interface 211 may employ transmission technologies, such as asynchronous transfer mode (ATM), bluetooth, code division multiple access (CDMA), enhanced data rates for global evolution (EDGE), ethernet, general packet radio service (GPRS), global system for mobile communications (GSM), infrared, Institute of Electrical and Electronics Engineers (IEEE) 802.11, IEEE 802.16, satellite, transfer jet, universal mobile telecommunications system (UMTS), wireless fidelity (WiFi), worldwide interoperability for microwave access (WiMAX), and the like, as well as combinations thereof.

Accordingly, processor 209 may be configured to implement a user interface, such as a graphical user interface, for inputting data corresponding to positioning information to memory 205. For instance, a networked portal, e.g., a webpage application, may be accessed and utilized to transfer data to light source 200 over one or more wired and/or wireless networks. Communication interface 211 may be employed to facilitate data transfer.

Figure 3:
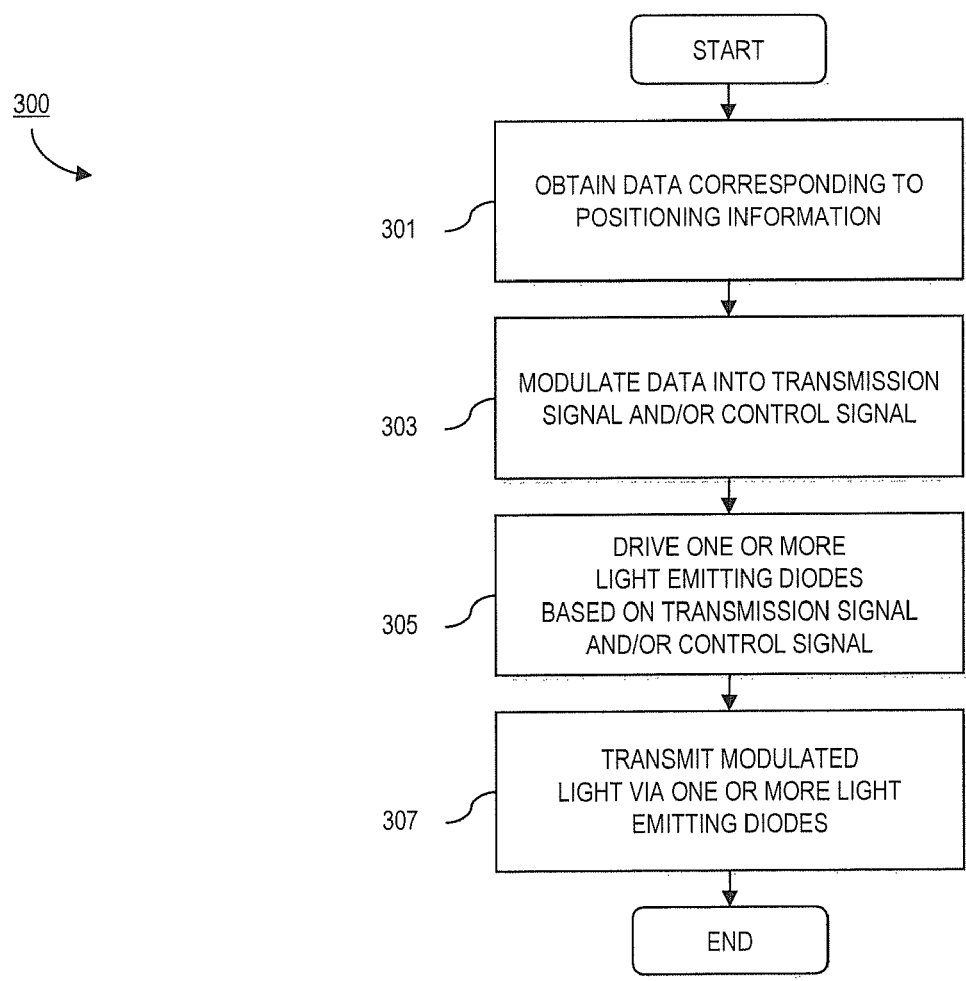
FIG. 3 is a flowchart of a process for transmitting positioning information via light communication, according to an exemplary embodiment.

FIG. 3 is a flowchart of a process for transmitting positioning information via light communication in accordance with light source 200. At step 301, light source 200 obtains data corresponding to positioning information. Processor 209 may receive such data from memory 205 or via communication interface 211. For instance, light source 200 may receive data over short-range communications via communication interface 211. In exemplary embodiments, communication interface 211 may be configured to continuously "listen" for data transmissions; however, it is contemplated that other "listening" schemes may be employed, such as periodic, on-demand, etc. According to one embodiment, communication interface 211 employs a short-range (e.g., bluetooth) or near-field (e.g., transfer jet) communication mechanism, whereby light source 200 is initialized by a corresponding transceiver (e.g., mobile terminal) configured to transmit data corresponding to positioning information to light source 200, as well as activate (e.g., turn on) light source 200 for light communications. Other modes of initialization are also contemplated, such as by the aforementioned networked portal. Accordingly, at step 303, processor 209 ports the data to modulator 207, which modulates the data into light transmission signals that are communicated to mobile station 105. In particular embodiments, these light transmission signals are visible light transmission signals. Control signals can be generated to drive LEDs 201a-201n. In step 305, LED controller 203 utilizes the transmission signals and/or the control signals to drive one or more LEDs, such as LEDs 201a-201n. Modulated light, such as modulated visible light, is transmitted via LEDs 201a-201n, per step 307.

Figure 4:
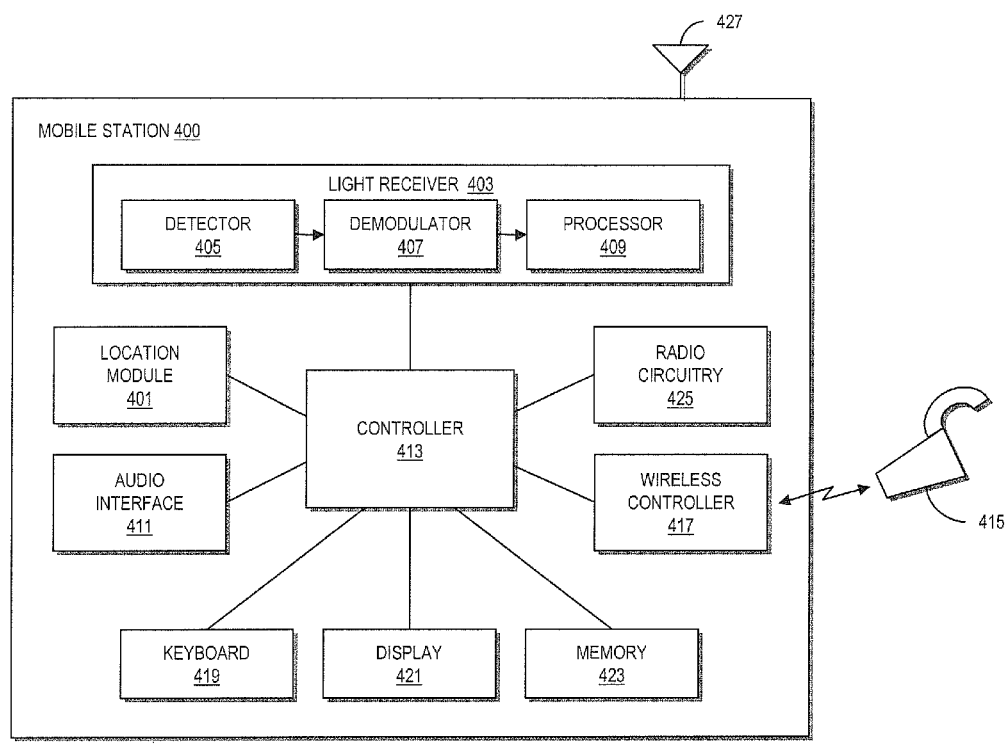
FIG. 4 is a block diagram of a mobile station configured to determine positioning information via received light communications, according to an exemplary embodiment.

FIG. 4 is a block diagram of a mobile station 400, corresponding to mobile station 105 of FIG. 1. Location module 401 determines the spatial position of mobile station 400 via data received from light receiver 403. Location module 401 can generate emergency alert notifications including spatial positioning information for transmission to a remote emergency response system or emergency response personnel.

Light receiver 403 includes detector 405, demodulator 407, and processor 409. Modulated light wave signals, such as modulated visible light wave signals, are received by detector 405 and converted into data signals that correspond to the modulation of the received light waves. While not illustrated, modulated light wave signals may pass through an optical conditioner, such as an amplifier, filter, etc., before or after being converted into data signals by detector 405. Detector 405 may be a charge-coupled device (CCD), a light-sensitive sensor, a photodiode, etc., included as a standalone component of mobile station 400 or as a component of a conventional camera of mobile station 400.

Demodulator 407 demodulates the data signals received from detector 405 into corresponding transmission signals. Processor 409 converts the transmission signals into spatial positioning information or corresponding data for use by location module 401.

Wireless headset 415 may be implemented for communication with a wireless controller 417 of the mobile station 400. With such implementation, visible light receiver 403 may be strategically positioned where modulated visible light wave signals can be more readily received. Headset 415 can employ any number of standard radio technologies to communicate with the wireless controller 417; for example, headset 415 can be Bluetooth enabled.

Audio interface 411, keyboard 419, display unit 421, and memory 423 enable a user to interface with mobile station 400. Display unit 421 can visually display, while audio interface 411 can aurally present, spatial positioning information, as well as other mobile station functions to users. It is noted that audio interface 411 may also be configured with voice recognition technology, such as for permitting users to verbally request mobile station 400 to acquire spatial positioning information via light communication. Memory 423 may be utilized to store various data including user profile information, such as a name, contact information, medical information, positioning information, etc. The user profile information may also be utilized by location module 401 in conjunction with the spatial positioning information to generate an emergency alert notification, which may further define needs for emergency response aids. Radio circuitry 425 permits communication over a radio network using radio frequency (RF) signaling. The radio network may provide a transmission medium for transmitting emergency alert notifications to an emergency response system and/or emergency response personnel.

Figure 5:
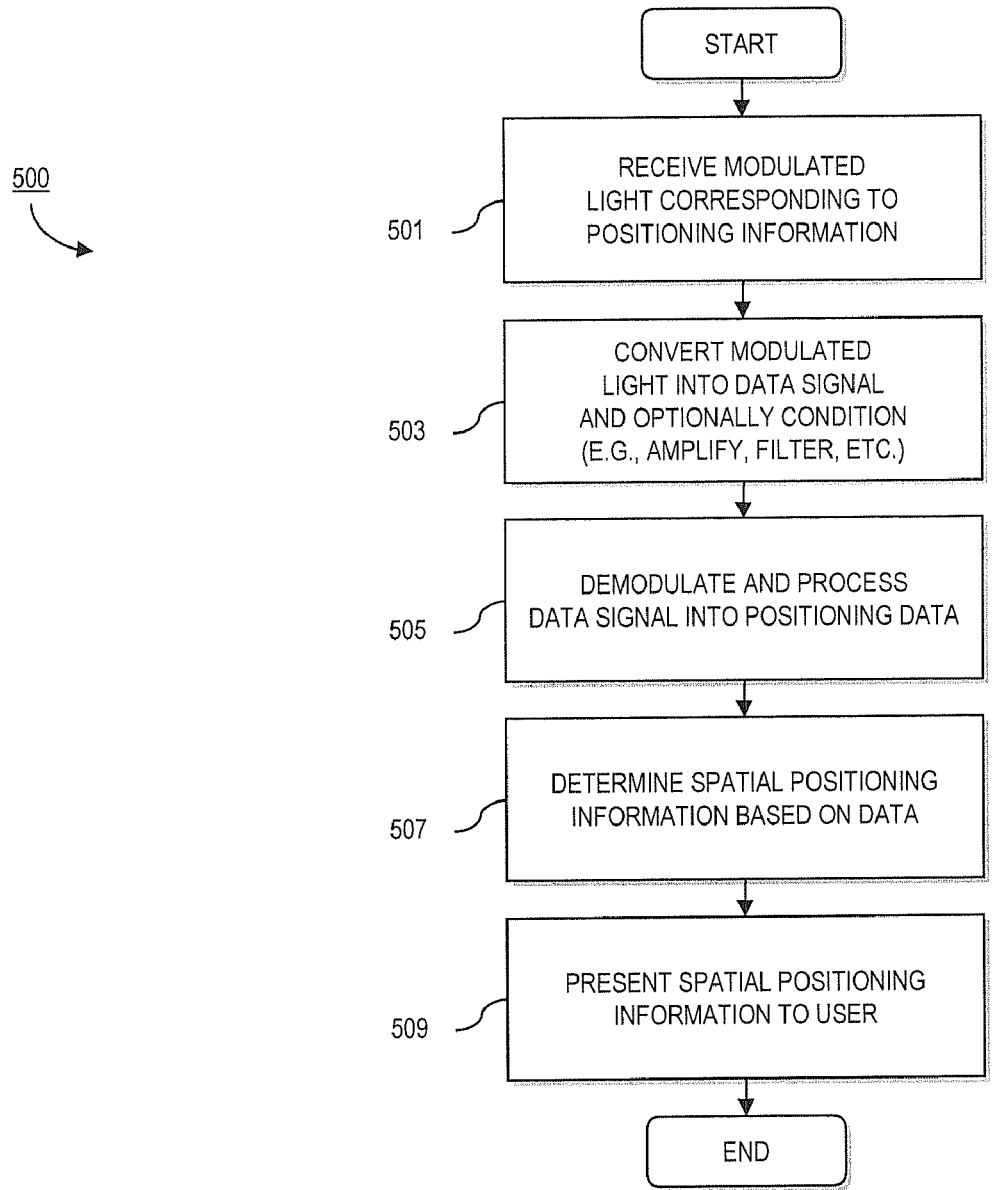
FIG. 5 is a flowchart of operation of a mobile station such as described with respect to FIG. 4, according to an exemplary embodiment.

FIG. 5 is a high level flowchart of exemplified mobile station operation in which positioning information is derived and presented to a user of the mobile station. At step 501, mobile station 400 receives modulated light wave signals, such as modulated visible light wave signals, corresponding to positioning information from, for example, light sources 101 and 103. Detector 405 of light receiver 403 detects the modulated visible light wave signals. In step 503, the received modulated light signal is converted into a data signal. The signal may be amplified and filtered in a known manner. At step 505, the data signal is demodulated via demodulator 407 and processed into positioning data via processor 409. The positioning data may be ported into location module 401 so that location module 401 may determine spatial positioning information corresponding to the spatial position of mobile station 400, per step 507. In step 509, mobile station 400 presents, via display unit 421, the spatial positioning information to a user of mobile station 400. Alternatively or additionally, the spatial positioning information may be conveyed to the user via audio interface 411 and/or headset 415.

Figure 6:
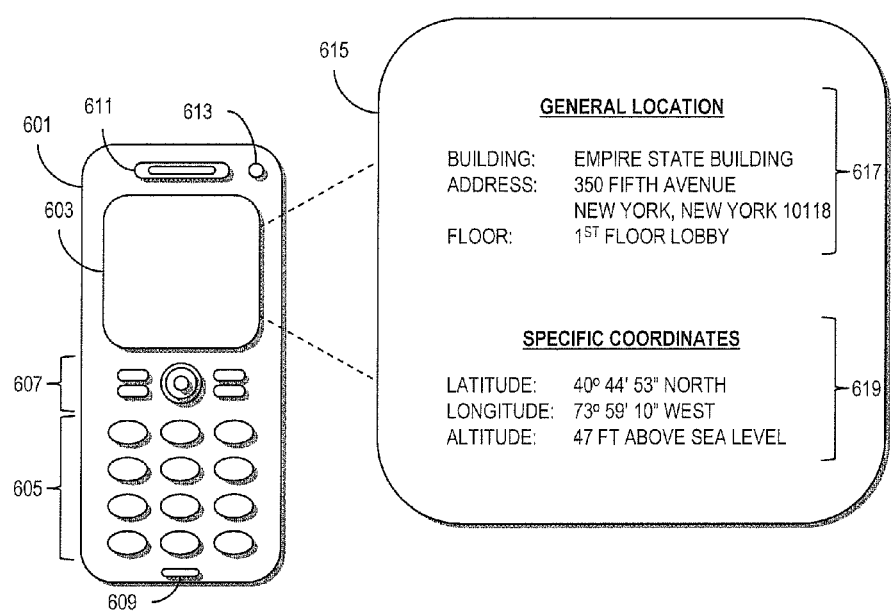
FIG. 6 is an schematic illustration of a mobile station positioning information display, according to an exemplary embodiment.

FIG. 6 is an exemplary illustration of positioning information displayed at mobile phone 601. The mobile phone 601 includes display 603, keyboard 605, input interface 607, audio interface 609, audio output 611, and light receiver (or detector) 613. A user may input control commands into the mobile phone via keyboard 605 and/or input interface 607 to acquire positioning information by way of modulated light wave signals received at (or detected by) light receiver 613. Voice recognition technology may be provided via audio interface 609, whereby the phone is responsive to uttered voice commands.

An example of spatial positioning information that may be presented on display screen 603, as illustrated at 615. The display includes general location information 617, as well as specific coordinate location information 619. General location information 615 is exemplified as a name of a building, an address of the building, and a floor of the building where mobile phone 601, i.e., the user of mobile phone 601, is located. A more detailed description, such as the specific area of the floor at which the light source is positioned, may also be displayed. Specific coordinate information 619 is exemplified by identification of latitude, longitude, and altitude of the mobile phone's light source. Spatial positioning information may also be presented via speaker 611. As previously mentioned, a headset (not shown) may also be employed to convey the spatial positioning information to the user, as well as be configured to host light receiver 613.

Although not illustrated, additional information, such as user profile information, that may be of interest can be included in the display and in transmission to a remote emergency response system. For example, the health history of the user may provide essential information to a response team for applying appropriate medical treatment.

Figure 7:
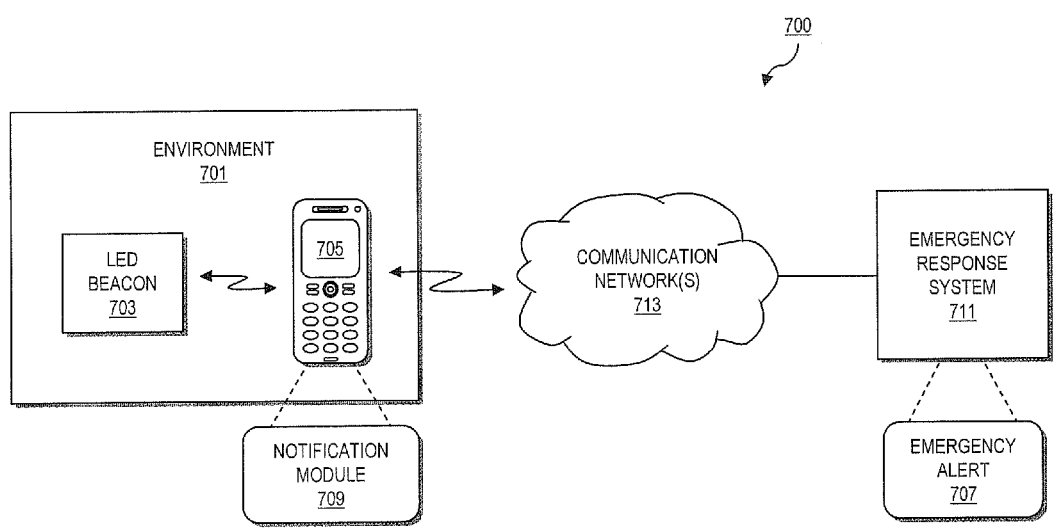
FIG. 7 is a block diagram exemplifying a system capable of providing emergency alert notifications including spatial positioning information, according to an exemplary embodiment.

FIG. 7 is a block diagram of the exemplified system 700 for providing emergency alert notifications including spatial positioning information. Environment 701 may comprise an indoor or otherwise obstructed environment location, such as illustrated in FIG. 1. Included therein are one or more fixed LED beacons 703. LED beacons 703 are light sources, such as light sources 101 and 103, illustrated in FIG. 1, which are configured to convey spatial positioning information for receipt by mobile station 705. According to one embodiment, LED beacons 703 are visible light sources. Mobile station 705 utilizes this received information to generate an emergency alert notification 707 via an internal notification module 709.

A plurality of LED beacons 703 may be dispersed throughout environment 701 in a predetermined mapped arrangement that may optimize their use as general lighting as well as to provide meaningful location information. In indoor settings, the LED beacons may be strategically located, for example, near elevators, staircases, entrance halls, and restrooms. LED beacons 703 may be "piggy-backed" onto existing infrastructures such as smoke detector systems, alarm systems, emergency door systems, wherein they may be activated in the case of an emergency. In outdoor settings, the LED beacons may be located, for example, at lamp posts, traffic lights, display signs, and the like.

Emergency alert notifications 707 may be transmitted to an emergency response system 711 and/or emergency response personnel via one or more communication networks 713, which may include any wired and/or wireless local area network (LAN), metropolitan area network (MAN), wide-area network (WAN), or any other suitable communication network, or combination thereof. Communication networks 713 may employ various wireless transmission technologies including, for example, CDMA, EDGE, GPRS, GSM, UMTS, WiMAX, WiFi, satellite, and the like. Communication networks 713 may embody or interface with the PSTN, the Internet, or a proprietary network of a service provider, such as a network of an emergency response provider.

Emergency response system 711 may comprise computing hardware for receiving emergency alert notifications 707. For instance, emergency response system 711 may be a computing device of an emergency dispatch operator who may, in turn, convey the information obtained via emergency alert notification 707 to better instruct emergency response personnel.

Figure 8C:
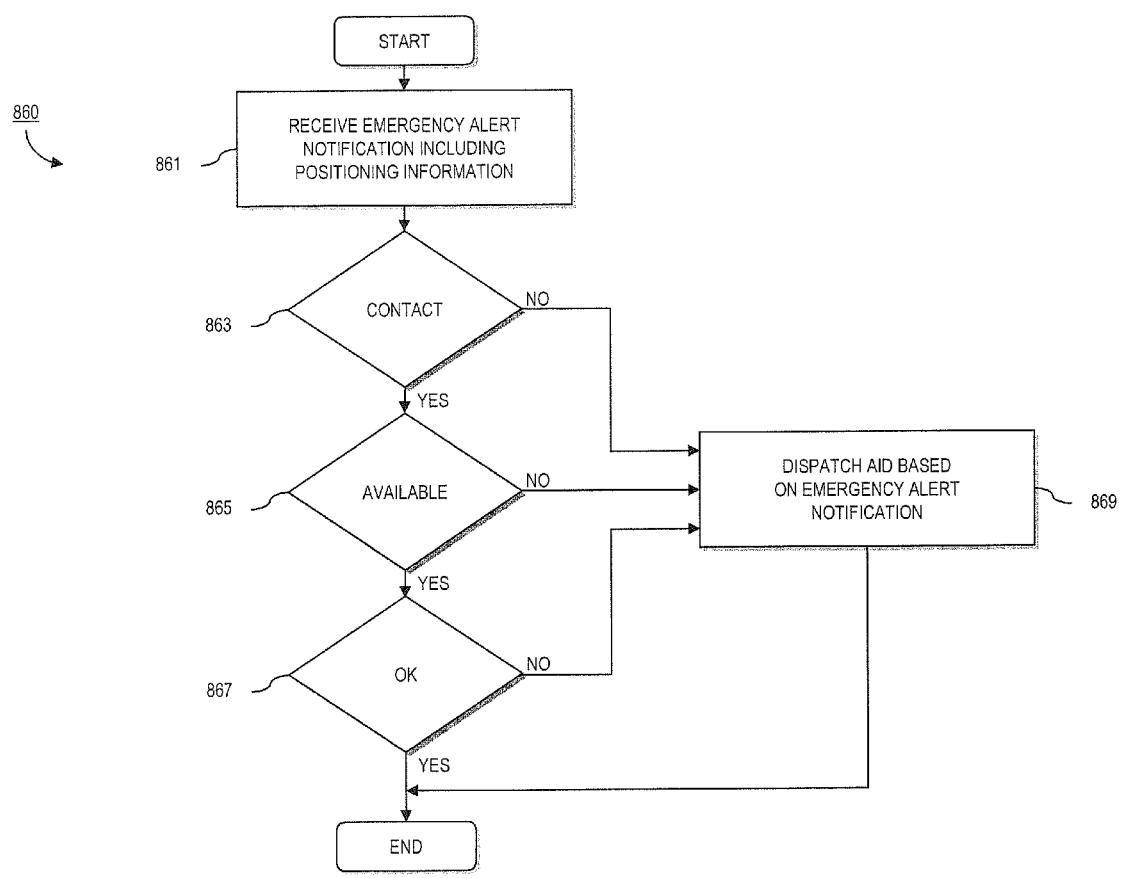

FIGS. 8A-8C are flowcharts of processes for providing emergency alert notifications, according to various exemplary embodiments. For illustrative purposes, processes 800, 830, and 860 are described with reference to FIG. 7. FIG. 8A is a flowchart of a process for transmitting, in the event of an emergency, positioning information via modulated light wave signals, according to an exemplary embodiment. At step 801, LED beacons 703 transmit modulated light wave signals associated with positioning information to a receiving station, such as by the process of FIG. 3. The receiving station can then formulate and transmit an emergency alert notification. According to one embodiment, LED beacons 703 unconditionally transmit the modulated light wave signals for reception by the receiving station, e.g., mobile station 705. In other embodiments, LED beacons 703 transmit the modulated light wave signals upon reception of an indication of an emergency situation. The indication may be received from one or more of the aforementioned existing infrastructures of environment 701, such as the smoke detector system, etc.

FIG. 8B is a flowchart of a process for transmitting an emergency alert notification in the event of an emergency, according to an exemplary embodiment. At step, 831, mobile station 705 receives modulated light from one or more light sources, e.g., LED beacons 703. At step 833, mobile station 705 determines its location in the manner described with respect to FIG. 5. Once the positioning information is determined by mobile station 705, notification module 709 may generate an emergency alert notification 707 based on this information. Emergency alert notification 707 may embody a text message, video message, or other suitable mobile station signal or packetized data information. Emergency alert notification may also be appended with user profile information to facilitate emergency response. An exemplary emergency alert notification is provided in FIG. 9. In step 837, mobile station 705 transmits emergency alert notification 707 to an emergency response system 711 via communication networks 713. Transmission may be initialized by the user of mobile station 705 or may be automatically initialized via coded information (e.g., command signals) transmitted to mobile station 705 via the modulated light signals provided by LED beacons 703.

FIG. 8C is a flowchart of an exemplified process for dispatching aid based on the reception of an emergency alert notification. At step 861, emergency response system 711 receives an emergency alert notification 707 that includes at least spatial positioning information of a light source at or near mobile station 705. Emergency alert notification 707 may also include user profile information. Emergency response system 711 may comprise computing hardware of an emergency response dispatch operator. A dispatcher may utilize the information provided by emergency alert notification 707 to provision aid. In step 863, the dispatcher may attempt to contact the user of mobile station 705 based on a directory address of mobile station 705 provided by emergency alert notification 707. If the dispatcher does attempt to contact the user, then, per step 865, the dispatcher can determine whether the user is available for communication. Assuming the user is available for communication then the dispatcher may question the user to determine the user's condition and whether an emergency response team must be dispatched at or near the location provided by emergency alert notification 707. If the dispatcher does not contact the user, the user is not available, the user is not "ok", or help is required, then the dispatcher may dispatch aid based on the information provided via emergency alert notification 707, per step 869. If contact is made with the user, the dispatcher can determine if a false alarm/notification has been received.

FIG. 9 is an illustration of an exemplary emergency alert notification display that includes positioning information as well as other significant information. As shown, the notification display includes basic contact information 901, corresponding to the user whose station originated the alert, as well as a date and time stamp 903. User profile information portion 909 may include any critical information that may be useful during emergency situations. By way of example, the user's age, blood type, race, prescription allergies, medical history, and the like are shown. General location information portion 905 identifies the name of the building in which the mobile station is situated, the address of the building, and the floor location of the mobile station in the building. Portion 907 lists specific coordinate information, shown as latitude, longitude, and altitude of the light source that has transmitted signals to the mobile station.

In this disclosure there are shown and described preferred embodiments of the invention and a few examples of its versatility. It is to be understood that the invention is capable of use in various other combinations and environments and is capable of changes or modifications within the scope of the inventive concept as expressed herein.

What is claimed is:

1. A method comprising:
   receiving, at a headset device associated with, and physically separate from a mobile station, a generated light signal from a light source location,
   wherein the light source location comprises a light-emitting diode (LED) and wherein the generated light signal comprises light modulated to produce an on-off keyed coded signal;
   transmitting information relating to the received light signal by the headset device to the mobile station, and
   deriving, by a processor at the mobile station, spatial positioning information from the on-off keyed coded signal.

2. The method as recited in claim 1, wherein the generated light signal is received by the mobile station, and the method further comprises:
   outputting the spatial positioning information via a speaker associated with the mobile station.

3. The method as recited in claim 1, further comprising:
   generating an emergency alert notification at a receiving station; and
   transmitting the emergency alert notification with the derived spatial positioning information to an emergency response system.

4. The method as recited in claim 1, wherein the generated light signal is received by the mobile station in proximity to the light source location, and the spatial positioning information corresponds to three-dimensional global positioning coordinates of the light source location, including latitude, longitude, and altitude.

5. The method as recited in claim 4, wherein the on-off keyed coded signal comprises light modulated using a 7-bit coding scheme.

6. The method as recited in claim 1, wherein the light is modulated by applying a pulsed signal to the LED.

7. The method as recited in claim 5, wherein the light source location is fixedly stationed at a structure having a plurality of vertical levels, each level corresponding to an associated light source location, and the coded signal represents the level of the structure at which the generated light signal is produced, wherein the 7-bit coding scheme allows the on-off-keyed coded signal to support 128 vertical levels.

8. The method as recited in claim 7, further comprising:
   illuminating with the light source an environment of the structure for general purpose lighting.

9. The method according to claim 1, wherein the generated light signal comprises visible light waves.

10. An apparatus comprising:
    a headset unit having a receiver configured to receive modulated light signals from at least one light source in proximity thereto;
    a mobile station wirelessly coupled to, and physically separate from the headset unit, the mobile station including a processor configured to derive spatial positioning information based on a received light signal; and
    a communication interface,
    wherein the processor is configured to generate an emergency alert notification containing the derived spatial positioning information and user profile information, and
    wherein the communication interface is configured to transmit the emergency alert notification to an emergency response system.

11. The apparatus as recited in claim 10, further comprising:
    a display unit coupled to the processor, the display unit configured to present spatial positioning information to a user.

12. The apparatus as recited in claim 10, wherein the user profile information comprises at least one of: contact information for a user, age, blood type, race, allergies, or medical history information.

13. The apparatus as recited in claim 10, wherein the apparatus comprises a mobile communication station, the light source is fixedly stationed at a structure having a plurality of vertical levels, each level corresponding to an associated light source, and the derived spatial positioning information identifies the level of the structure at which the light signal is produced.

14. The apparatus as recited in claim 10, wherein the derived spatial positioning information corresponds to three-dimensional global positioning coordinates including latitude, longitude, and altitude of a user.

15. The apparatus according to claim 10, wherein the receiver comprises a charge-coupled device.

16. The apparatus according to claim 10, wherein the light source comprises a light-emitting diode.

17. A system comprising:
 a light source configured to transmit a modulated light signal upon receipt of an indication of an emergency situation from an emergency response system; and
 a mobile station comprising a receiving unit, configured to receive the modulated light signal, and a processor coupled thereto, the processor configured to derive spatial positioning information from the received modulated light signal,
 wherein the mobile station comprises a transmitter configured to transmit an emergency alert notification that includes the spatial positioning information to the emergency response system remote from the mobile station.

18. The system according to claim 17, wherein the emergency alert notification includes user profile information associated with a user of the mobile device.

19. The system according to claim 17, wherein the spatial positioning information corresponds to a floor level of a building to which the light source is affixed, the spatial positioning information also comprising global positioning coordinates.

* * * * *